United States Patent

Burger

Patent Number: 5,310,443
Date of Patent: May 10, 1994

[54] APPARATUS FOR THE PRODUCTION OF TUBULAR BODIES

[75] Inventor: Hans Burger, Pfäffikon, Switzerland

[73] Assignee: KMK Karl Magerle Lizenz AG, Zug, Switzerland

[21] Appl. No.: 826,787

[22] Filed: Jan. 28, 1992

[30] Foreign Application Priority Data

Feb. 5, 1991 [CH] Switzerland .................. 00339/91

[51] Int. Cl.⁵ .............................................. B29D 23/00
[52] U.S. Cl. .................................. 156/466; 156/498; 156/583.5
[58] Field of Search ............... 156/433, 466, 498, 201, 156/203, 583.5

[56] References Cited

U.S. PATENT DOCUMENTS

| | | | |
|---|---|---|---|
| 2,676,642 | 4/1954 | Bergstein et al. | 156/498 |
| 3,388,017 | 6/1968 | Grimsley et al. | 156/498 |
| 3,575,769 | 4/1971 | Radzio | 156/466 |
| 4,123,312 | 10/1978 | Schmid et al. | 156/466 |
| 4,210,477 | 7/1980 | Gillespie et al. | 156/466 |
| 4,997,507 | 3/1991 | Meyer | 156/498 |

*Primary Examiner*—Michael W. Ball
*Assistant Examiner*—Richard Crispino
*Attorney, Agent, or Firm*—Bachman & LaPointe

[57] ABSTRACT

In an apparatus for the production of tubular bodies such as tubes from a foil strip including a weldable plastic material, the longitudinal edges of which are welded together between two endless belts under the effect of heat and pressure with subsequent cooling, part of a belt runs against a mandrel in which individual portions thereof can be set to different temperatures to provide for selective control of the belt in order to increase the rate of production.

6 Claims, 4 Drawing Sheets

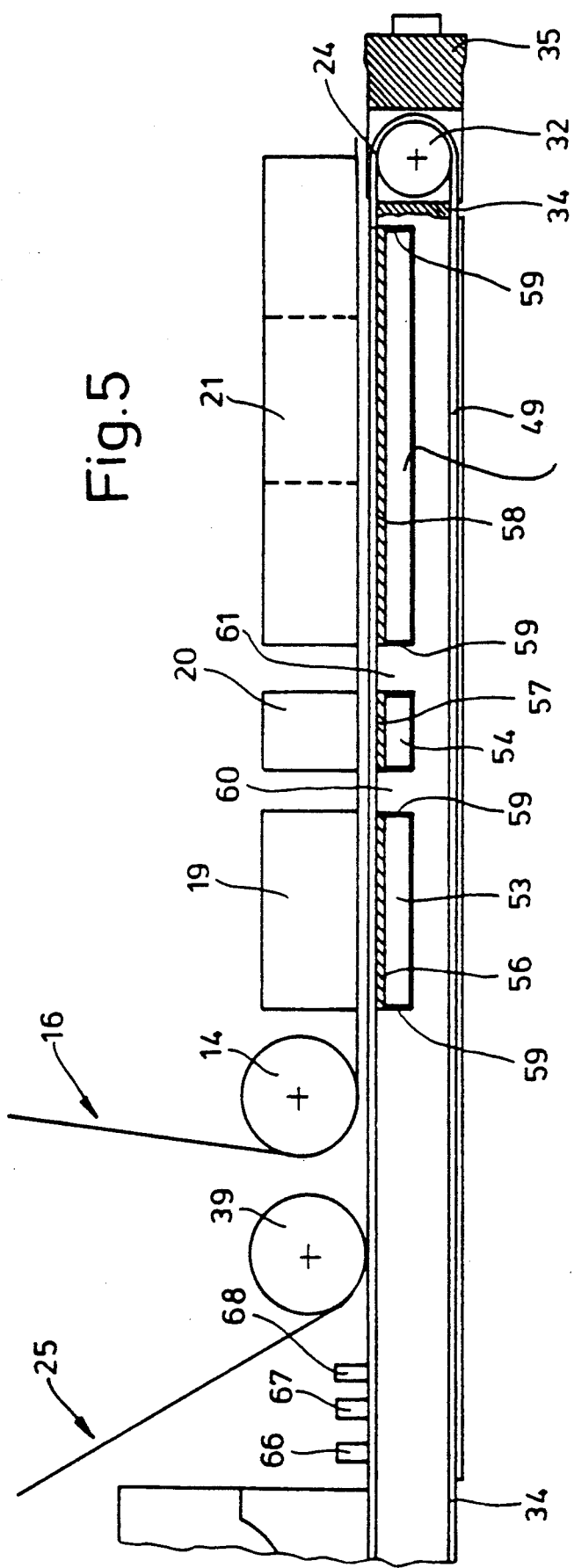

APPARATUS FOR THE PRODUCTION OF TUBULAR BODIES

BACKGROUND OF THE INVENTION

One form of procedure for the production of tubular bodies for packaging tubes involves producing the tubular bodies from a foil strip which includes a weldable plastic material, by virtue of the longitudinal edges of the foil strip being thermally joined together in mutually overlapping relationship. The thermal joining or seaming operation is carried out in an apparatus referred to as a longitudinal seam welding machine or side seamer, which may comprise a shaping belt for shaping the foil strip around a mandrel to provide the tubular body, with a lower driven transportation belt running against the mandrel and an upper driven transportation belt, with the longitudinal edges of the foil strip being received between the belts in mutually overlapping relationship. A heating means acts on the upper transportation belt to cause the overlapping longitudinal edges to fuse together and the fused edges are then pressed, with pre-hardening of the plastic material. The pre-hardened plastic material is then finally hardened under the action of a cooling means disposed downstream of the pressing means. The upper and lower transportation belts which thus run one above the other are generally made of metal so that the action of heat and pressure on the belts causes the material of the overlapping edges to be fused together in a fused seam before the resulting seam is then cooled to effect hardening thereof.

In such an apparatus, the upper transportation belt passes around sets of rollers, wherein the heat generating, pressing and cooling means are disposed between the upper and lower runs of the upper belt, being adapted to act on the lower run thereof. In the part of the apparatus in which the fusing, pressing and cooling operations, that is to say the actual operation of forming the welded seam, takes place, the lower transportation belt runs in the same direction as the upper belt, in the mandrel referred to above.

In that arrangement, the upper run of the lower belt is guided on a surface of the mandrel and co-operates with the lower run of the upper belt in the manner of a support means while the lower run of the lower belt experiences a change in its direction of movement of the mandrel and goes back in the mandrel.

The upper run of the lower belt may be heated before it passes on to the mandrel, by means of external heating devices which apply heat to the upper run of the belt. The mandrel may also include heating inserts on which the upper run of the lower belt moves. In order to accelerate cooling of the welded seam, the mandrel may be cooled in the section which co-operates with the cooling means that acts on the upper transportation belt.

The mandrel in the above-indicated apparatus is the cause of limitations in terms of an increase in operating speed and economy of longitudinal seam welding machines or side seamers, such limitations being due to the quality requirements in respect of the welded seams. It is not possible to make use of tubular bodies with defective welded seams, welding which is incomplete in places on the tubular body or seams which have unwelded material squeezed out of the edge portions of the mutually overlapping longitudinal edges of the foil strip, as they could result in the packaged material being unacceptably contaminated.

In an endeavor to eliminate those and other seam defects when using high operating speeds, the heat applied to and the heat removed from the weld, by way of the two belts, that is to say the lower run of the upper belt and the upper run of the lower belt which thus act as welding tools, in conjunction with the effect of pressure applied to the weld, are to be kept closely matched to the nature and material of the plastic foil and the speed of movement, that is to say the operating speed of a side seamer.

In regard to the upper belt, it is substantially possible to achieve good matching in relation to laminate materials by virtue of adjustability of the individual action of the heating means, pressing means and cooling means, which represent individual elements that are structurally separate from each other, and which thus constitute sections of the arrangement which are individualized in terms of heat produced and pressure applied as well as cooling effect, over the welding section of the apparatus.

However the mandrel in the above-indicated apparatus cannot provide for a comparable matching effect, for the reason that, when the belt is heated and cooled upstream of and in the mandrel, the belt experiences a temperature gradient which decreases in the direction of the cooling portion, and that temperature gradient can be adjusted overall, but it cannot be adjusted in an individualized fashion for each section, in order to provide a good matching effect. That means that the above-indicated mandrel which contributes to the welding process determines to a not inconsiderable degree the operating speed and economy of side seamers as well as the quality of the welded seams produced.

SUMMARY OF THE INVENTION

An object of the present invention is to provide an apparatus for the production of tubular bodies, more especially for packaging tubes, from a foil strip including a weldable plastic material, which avoids the disadvantages of the above-indicated apparatus.

A further object of the invention is to provide an apparatus for the production of a tubular body from foil strip including weldable plastic material by side seam welding thereof, which permits improved control of the temperature of the strip in the longitudinal direction thereof as it passes through the machine.

Still a further object of the present invention is to provide an apparatus for the production of tubular bodies from foil strip including weldable plastic material, having a shaping mandrel whose thermal content can be adjusted in an individualized fashion in respective portions thereof over its longitudinal extent.

Yet another object of the present invention is to provide an apparatus for the production of tubular bodies from foil strip comprising weldable plastic material, which affords an increase in operating speed while providing high-quality products by virtue of improved temperature control in the direction of movement of the foil strip through the apparatus.

The foregoing and other objects are achieved by an apparatus for the production of tubular bodies such as packaging tubes from foil strip which includes weldable plastic material and the longitudinal edges of which are to be thermally joined together. The apparatus comprises a shaping belt for shaping the foil strip around a mandrel to provide the tubular body, as well as a lower driven transportation belt which runs against the mandrel and an upper driven transportation belt, between which belts the longitudinal edges of the strip are received in mutually overlapping relationship. A heating means acts on the upper transportation belt and causes the overlapping edges to fuse together, and the fused longitudinal edges are subjected to pressure by a pressing means, with preliminary hardening of the plastic material. A cooling means downstream of the pressing means provides for final hardening of the plastic material. The lower transportation belt is adapted to have individual thermal contents in the regions of each of the heating means, pressing means and cooling means.

As will be seen in greater detail hereinafter, by virtue of the mandrel being divided in accordance with the invention into successively disposed portions, the temperatures or thermal contents of which are adapted to be individually adjusted, the apparatus according to the invention gives the advantage of an increase in operating speed, while providing satisfactory welded seams of high quality on tubes of a material of the above-indicated kind.

A further advantage of the apparatus according to the invention is that the start-up time of a longitudinal seam welding machine or side seamer can be markedly reduced by virtue of temporarily increased heating of the individual portions of the mandrel. The structure in accordance with the principles of the invention also affords the advantage of reducing the amount of waste material produced in the start-up phase of the apparatus, due to foil material not being welded or being only unsatisfactorily welded, when starting the apparatus operating.

Further objects, features and advantages of the invention will be apparent from the following description of a preferred embodiment.

BRIEF DESCRIPTION OF THE DRAWINGS

FIG. 5 is a view in longitudinal section of a mandrel as illustrated in FIG. 2 with inserts therein.

DESCRIPTION OF THE PREFERRED EMBODIMENT

Figure 1:
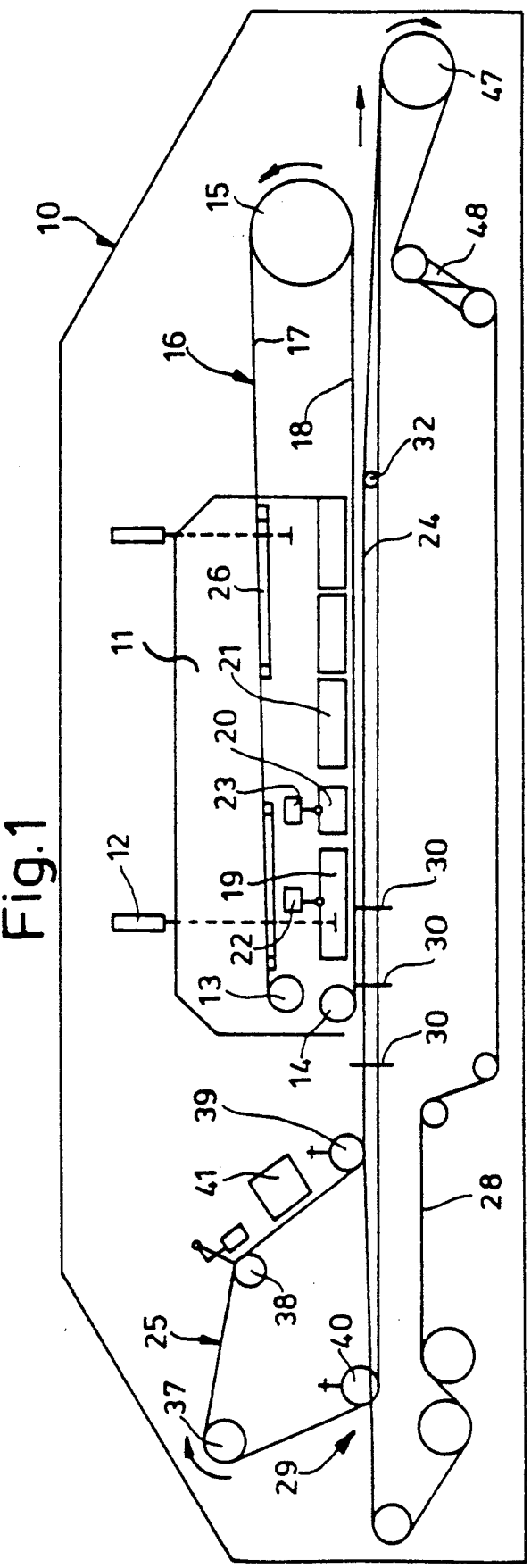
FIG. 1 is a diagrammatic side view of an apparatus for the production of packaging tubes.

Referring firstly to FIG. 1, the apparatus illustrated therein for the production of tubular bodies, for example packaging tubes, from a foil strip which includes a weldable plastic material and the longitudinal edges of which are to be thermally joined together, comprises a base or mounting plate 10 and a carrier plate 11 which is mounted on the mounting plate 10 movably in a vertical direction thereon. Reference numeral 12 identifies control members which are connected to the mounting plate 10 and the carrier plate 11 so that the carrier plate 11 can be vertically adjusted in its position relative to the mounting plate 10 and fixed in the adjusted position.

At its front or upstream end which is towards the left in FIG. 1, the carrier plate 11 carries two spaced-apart rollers 13 and 14. A drive roller 15 is arranged at a spacing from the rear or downstream end of the carrier plate 11, which is towards the right in FIG. 1, on the mounting plate 10.

Passing around the rollers 13 and 14 and the drive roller 15 is an endless upper metal belt 16, referred to hereinafter as the upper transportation belt 16, providing an upper belt run 17 and a lower belt run 18. Disposed between the upper belt run 17 and the lower belt run 18 in succession as viewed in the direction of movement of the transportation belt 16 is a heating means 19, a pressing means 20 and a cooling means 21. The lower belt run 18 passes beneath the heating means 19, pressing means 20 and cooling means 21 and they thus cooperate with the lower belt run 18.

For the purposes of vertical adjustment, the heating means 19 and pressing means 20 are each provided with a control member 22 and 23 whereby the heating means 19 and pressing means 20 are vertically adjustable in relation to the lower belt run 18.

The heating means 19 preferably includes an inductively operative high-frequency heating arrangement which in the operating condition generates heat in the lower belt run 18 of upper transportation belt 16 and also in the subjacent upper belt run 24 of a lower driven belt 25, hereinafter referred to as the lower transportation belt 25.

The upper transportation belt 16 and the lower transportation belt 25 preferably comprise metal if heating thereof is effected inductively by means of high-frequency energy. As the metal belts 16 and 25 are of low mass, they can be rapidly heated up and cooled down without other parts of the apparatus also having to be heated up and cooled down therewith.

Belts 16 and 25 of metal are preferred if pure plastic foils are involved in the welding operation. If a plastic foil includes a metal foil which, heated by induction, melts the plastic material, then the belts 16 and 25 may comprise plastic material, for example polytetrafluoroethylene.

The heating means 19 which serves for inductive heating essentially comprises a high-frequency coil, whose output of energy is concentrated on to the area to be heated, beneath the heating means 19. The high-frequency coil is fed by a high-frequency generator of known design which therefore does not need to be described in detail herein.

The cooling means 21 which is disposed downstream of the pressing means 20 removes from the welded seam the excess heat thereof for setting thereof, after the seam has been subjected to a pressing effect by virtue of the pressing means 20, preferably with pre-hardening of the welded material formed by the fused overlapping longitudinal edges of the foil strip.

As still shown in FIG. 1, the upper belt run 17 of the transportation belt 16 passes over cooling bars 26 which cool the upper belt run 17 to such an extent that it moves to the heating means 19, at an approximately constant temperature.

Figure 3:
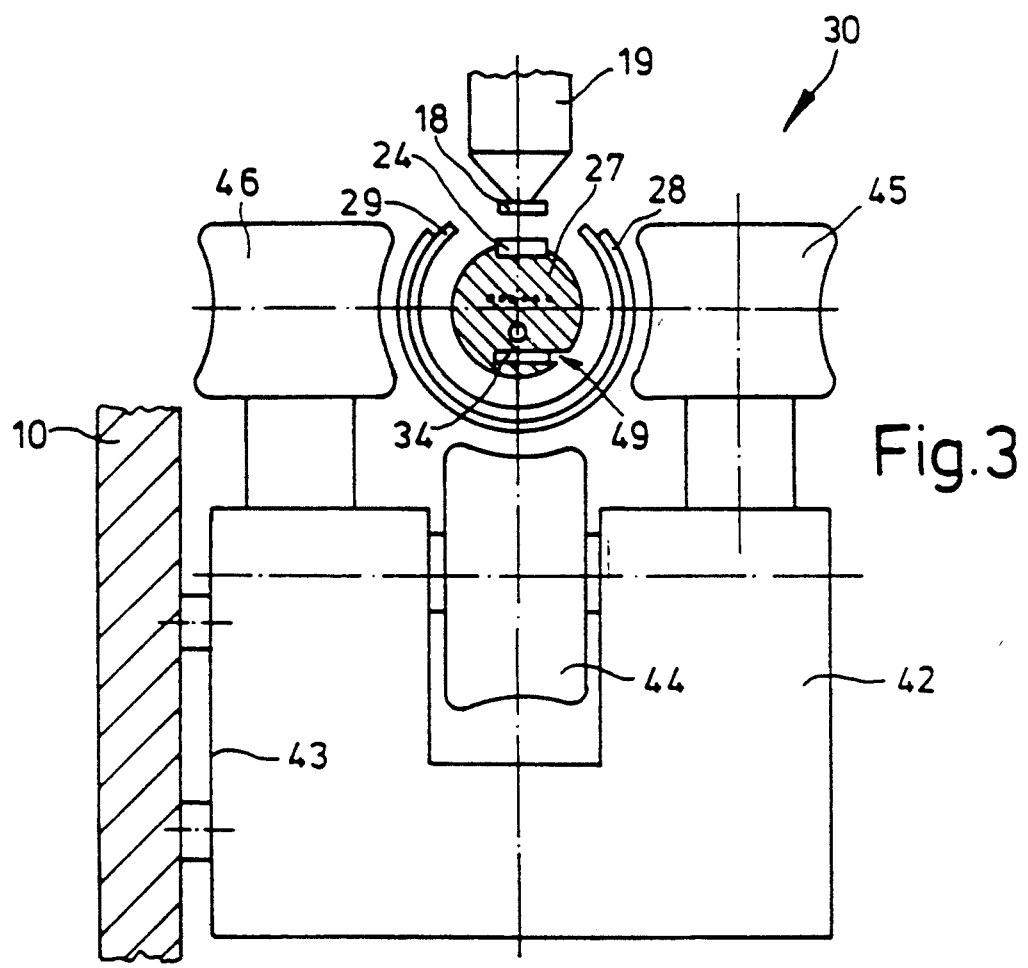
FIG. 3 is a front view of a shaping assembly in the tube-forming region of the apparatus.

The part of the apparatus for forming a tubular body includes a mandrel which is referenced 27 in for example FIG. 3, a shaping belt 28 which is driven in rotation and which carries a plastic foil strip referenced 29 in FIG. 3, on its side which is towards the mandrel 27, and a plurality of shaping assemblies indicated at 30 in FIG. 1, which are arranged at spacings from each other in the longitudinal direction of the mandrel 27 and which shape the shaping belt 28 and the foil strip 29 around the peripheral surface of the mandrel 27, as can be seen from FIG. 3.

Figure 2:
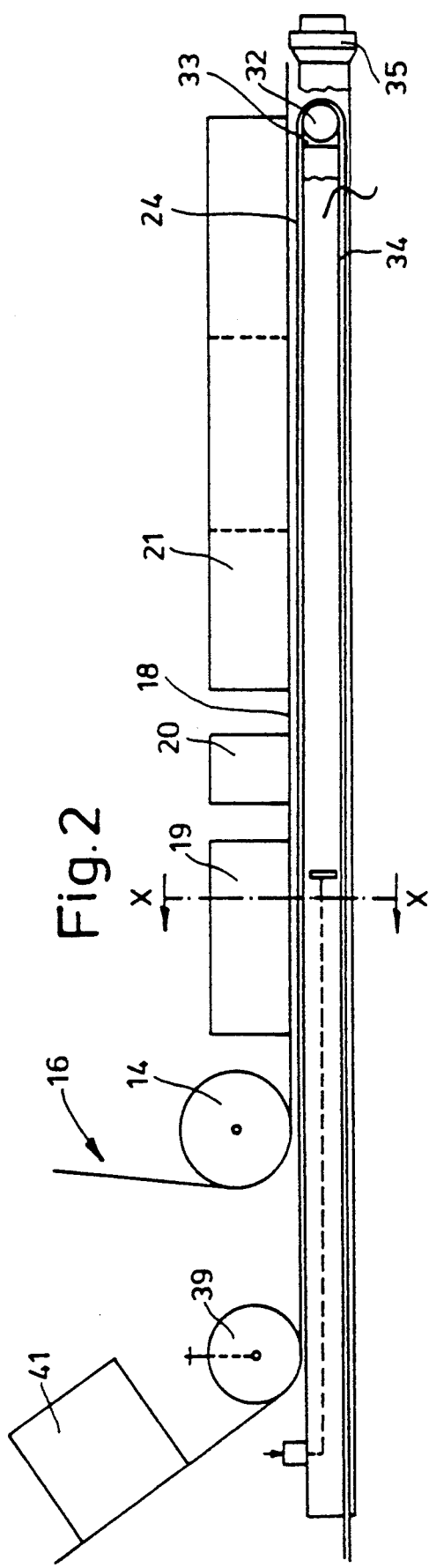
FIG. 2 is a view on an enlarged scale of part of the apparatus shown in FIG. 1, showing the mandrel thereof in the tube-forming region of the apparatus.

Referring now also to FIGS. 2 and 3, the mandrel 27 which is shown in cross-section in FIG. 3 and which is illustrated as being round but which in accordance with the invention may also be polygonal, preferably square or rectangular, is arranged on the mounting plate 10. As shown in FIGS. 2 and 3 it extends in the same direction as and at a spacing with respect to the heating means 19, the pressing means 20 and the cooling means 21. The upper run 24 of the endless driven lower transportation belt 25 of metal moves on an external surface of the mandrel 27, being guided in a groove indicated at 31 in FIG. 4 in the longitudinal direction of the mandrel 27. The upper run 24 moving against the mandrel 27 can be seen in FIG. 3. At the end of the mandrel 27 which is towards the right in FIG. 2, the lower transportation belt 25 passes around a direction-changing roller 32 which is accommodated in the mandrel 27 in an upwardly open recess indicated at 33, and returns as a lower belt run indicated at 34 in FIG. 3 in a recess 49 in the mandrel 27.

The free end of the mandrel 27, which is towards the right in FIG. 2, carries a disk 35 over which the interior of the tubular body passes and which is intended to resist the escape of compressed air in the direction of movement of the tubular body. The purpose of the compressed air will be referred to below.

The other free end of the mandrel 27, that is to say in the region of the heating means 19, does not have any baffle configuration of that kind as that location involves only a slight pressure drop due to the foil strip/-shaping belt movement.

The above-mentioned compressed air is introduced into the tubular body in the region of the heating means 19 by way of air ducts indicated at 50, 51 and 52 and serves to reduce friction between the foil strip 29 and the mandrel 27. When the pressure of the compressed air is suitably adjusted, the compressed air also serves to enlarge the diameter of the tubular body to compensate for diametral tolerances which can cause difficulties in terms of further processing of the tubular bodies, in particular fitting them with tube head portions or tops.

Figure 4:
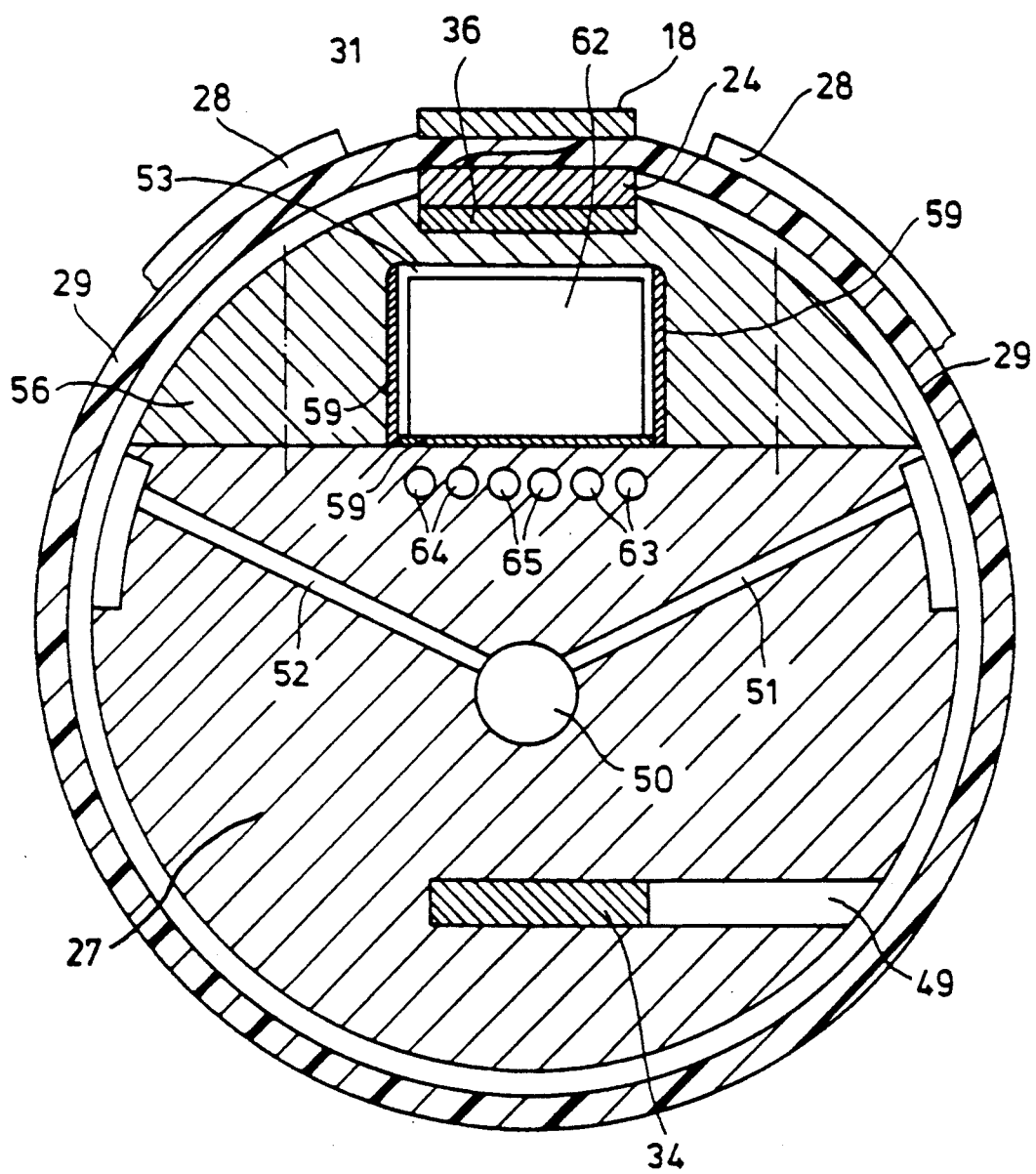
FIG. 4 is a front view in section through the mandrel taken along line X—X in FIG. 2, on an enlarged scale.

Referring now in greater detail in FIG. 4, at its bottom the groove or slot 31 is provided with a coating or covering 36 on the one hand to reduce friction and on the other hand to provide electrical insulation. In that way, formed between the upper belt run 24 of the lower transportation belt 25 and the lower belt run 18 of the upper transportation belt 16 is a gap in which overlapping edges of the foil strip 29 are initially fused to form a welded seam which extends in the longitudinal direction of the tubular body, pressed with the cut edges flowing into each other, and then cooled.

Looking again at FIG. 1, the lower transportation belt 25 passes around a drive roller 37 which is arranged fixedly on the mounting plate 10, a freely rotatable adjusting roller 38 which is arranged at its inside, an adjusting roller 39 which is arranged at its outside and which passes the upper belt run 24 into the guide groove 31 in the mandrel 27 and which, co-operating with the direction-changing roller 32, ensures horizontal displacement of the belt run 24 in proper relationship with the bottom of the guide groove 31, the above-mentioned direction-changing roller 32 which is not adjustable in terms of the position of its axis, and an adjusting roller 40.

For heating of the lower transportation belt 25 to at least the entry temperature of the lower belt run 18 into the heating means 19, a heating device 41, preferably in the form of a high-frequency coil, is disposed upstream of the adjusting roller 39.

FIG. 3 shows a shaping assembly 30 with the mandrel 27 mounted within the shaping assembly 30, in section, together with the heating means 19 which is disposed above the mandrel 27. The shaping assembly 30 comprises a carrier block 42 which is fixed at its side 43 to the mounting plate 10. The shaping assembly 30 has three freely rotatable shaping rollers 44, 45 and 46. The shaping roller 44 which is disposed beneath the mandrel 27 rotates about a horizontal axis while the other shaping rollers 45 and 46 which are arranged at respective sides of the mandrel 27 rotate about vertical axes which are adjustable eccentrically for fine adjustment of the magnitude of the region of overlap of the edges of the foil strip.

Proceeding from the first or most upstream shaping assembly 30 to the shaping assembly 30 which positions the edges of a foil strip 29 in overlapping relationship on the upper run 29 of the transportation belt 25, the spacings of the horizontal and vertical axes of rotation of the rollers of the respective shaping assemblies 30, relative to the center point of the mandrel 27, decrease, so that the convexly shaped peripheral surfaces of the shaping rollers 44, 45 46 guide the shaping belt 28 which passes between the rollers 44, 45, 46 and the mandrel 47, with the foil strip 29 lying thereon, around the mandrel 27 in the longitudinal direction thereof. The width of the shaping belt 28 is less than that of the foil 29 lying thereon.

Looking at FIG. 4, the foil strip 29 is guided against the mandrel 27 only to such an extent that edges of the foil strip 29 overlap each other between the lower run 18 of the upper transportation belt 16 and the upper run 24 of the lower transportation belt 25, and are held in that position by the edges of the shaping belt 28, but the inward surface of the tubular body formed in that way does not bear against the outside surface of the mandrel 27, to eliminate frictional forces.

In that way, when dealing with plastic foils, including laminate materials of plastic foils of different chemical compositions and including plastic-laminate foils with foil of metal, for example aluminum, stretching of the tube and tearing-away of the overlap seam which is fused in the heating means 19 is prevented by the adjoining non-fused material of the wall of the tubular body, thus ensuring the formation of a welded seam which is of uniform density and tear-free at its outer edges. As soon as the welded seam is of a predetermined level of mechanical strength and stability, due to the removal of heat therefrom, the spacings of the axes of the shaping rollers 44, 45, 46 from the center point of the mandrel 27 increase again so that the shaping belt 28 opens and the shaping belt 28 with the shaped tube, after the tube has been released by the lower belt run 18 and the upper belt run 24, can run off the mandrel 27 substantially in the longitudinal direction relative to the mandrel 27.

As shown in FIG. 1, the endless shaping belt 28 which preferably comprises easily deformable, fiber-reinforced plastic material is driven by way of a drive roller 47 and passed around a belt tensioning device 48 and further suitably positioned direction-changing rollers (shown but not referenced).

The drive roller 47, the belt tensioning device 48 and the direction-changing rollers are arranged on the mounting plate 10 at spacings such that the center line of the shaping belt 28 coincides with the vertical center line of the mandrel 27 so that the edges of the shaping belt 28, as they pass through the shaping assemblies 30, possibly assisted by eccentric positioning of the shaping rollers 45, 46, are always disposed in opposite relationship in a substantially horizontal plane, thereby guaranteeing an overlap region which is of accurate dimension in terms of its width, as shown in FIG. 4.

For the purposes of producing a satisfactory welded seam on tubular bodies from foils comprising plastic material or materials, in particular to provide for a satisfactory surface configuration thereof and to prevent the formation of squeezed-out portions of molten plastic material along the inner and outer edges of the overlap region and for the avoidance of stresses and stretching phenomena in and at the edges of the weld seam, it has proven to be advantageous for the transportation belts 16 and 25 and the shaping belt 28 to move at the same speed, so that there is no relative movement between the lower belt run 18 and the overlapping edges of the foil strip 29, the overlapping edges of the foil strip 29 and the upper belt run 24 and between the shaping belt 28 and the foil strip 29 lying thereon, whereby the overlapping edges of the foil are fused, pre-hardened, pressed and cooled between the moving transportation belts 16 and 25, in a rest position in which the overlapping edges are accordingly stationary relative to the transportation belts.

For that purpose the drive rollers 15, 37 and 47 are controlled to be matched to each other in respect of their drive speeds.

Referring now to FIG. 5, the mandrel 27 is of such a configuration that it has three hollow spaces or cavities 53, 54 and 55 therein. The cavity 53 is associated with and thus disposed beneath the heating means 19, the cavity 54 is associated with and disposed beneath the pressing means 20 and the cavity 55 is associated with and disposed beneath the cooling means 21.

The cavities 53, 54 and 55 are provided in inserts 56, 57 and 58 respectively which transversely extend through the mandrel 27 in recesses corresponding in terms of their width approximately to the longitudinal extents of the heating means 19, pressing means 20 and cooling means 21, and co-operate with the mandrel 27 to divide the outer periphery thereof.

FIG. 4 shows the insert 56 in cross-section in the installed position thereof while FIG. 5 shows the inserts 56, 57 and 58 in longitudinal section in the installed position thereof in the mandrel 27. With the exception of the wall surfaces which are towards the upper belt run 24 of the transportation belt 25, all other wall surfaces of the cavities 53, 54 and 55 are preferably provided with insulation as indicated at 59 in FIG. 4 so that the cavities 53, 54 and 55 are insulated relative to the mandrel 27, the inserts 56, 57 and 58 and the intermediate portions 60, 61 between the cavities 53, 54 and 54, 55 respectively so that the thermal contents of the cavities 53, 54, 55 are transmitted to the upper belt run 24 passing thereover, and not to the mandrel, whereby a drop in temperature in the mandrel from the heating means 19 to the cooling means 21 is prevented and the thermal contents of the mandrel can be adjusted sectorially in a fashion which is individually matched to the tubular body to be welded.

FIG. 4 shows that the cavity 53 accommodates an electrical resistance heating means diagrammatically indicated at 62 which is powered by way of conduits 63.

In accordance with the invention it is also possible for the heating means to be in the form of an induction heating means, and both heating arrangements are adjustable in terms of their output power within wide limits. It is also possible for the arrangement to be such that the cavity 53 can be designed to have a gaseous or liquid agent flowing therethrough, with the provision of feed and discharge conduits of a suitable nature.

The cavity 54 can be supplied with a liquid or gaseous agent by way of conduits indicated at 64 in FIG. 4, being a feed and a discharge conduit respectively, and the cavity 55 can be similarly supplied with a liquid or gaseous agent by way of conduits 65, once again being a feed and a discharge conduit respectively, whereby the cavities can be so adjusted in regard to their thermal content that the portions of the belt run 24 corresponding to the respective cavities can be appropriately cooled or heated.

The cavities 53, 54 and 55 are preferably heated when starting up the apparatus, in order to minimize the amount of foil waste in the start-up phase. After that initial phase, the thermal content of the cavities 53, 54 and 55 can be adjusted to the optimum values, depending on the particular kind of plastic material to be processed, for example by reducing the temperatures of the heating means and/or the gaseous of liquid agent to provide for warming, pressing with a pre-hardening action and subsequent cooling.

It will be appreciated that the above-described apparatus has been set forth by way of example and illustration of the principles of the present invention and that various modifications and alterations may be made therein without thereby departing from the spirit and scope of the invention.

I claim:

1. Apparatus for the production of a tubular body from a foil strip which includes a weldable plastic material and the longitudinal edges of which are thermally joined together, comprising a mandrel, a shaping belt adapted to shape the foil strip around the mandrel to provide a tubular body, a lower transportation belt, having an upper and lower belt run, which runs against the mandrel, an upper transportation belt having an upper and lower belt run, between the upper belt run of the lower transportation belt and the lower belt run of the upper transportation belt said longitudinal edges of the foil strip are received in mutually overlapping relationship, means for driving the transportation belts, a heating means adapted to act on the lower belt run of the upper transportation belt to cause said overlapping longitudinal edges to fuse, a pressing means for pressing said fused longitudinal edges, with prehardening of the plastic material, a cooling means arranged downstream of the pressing means for completing hardening of the plastic material, and means for adjusting the temperature of the upper belt run of the lower transportation belt associated with the lower belt run of the upper transportation belt in individual regions at each of the heating means, pressing means and cooling means, wherein said temperature adjusting means include at least first, second, and third cavities in the longitudinal extent of the mandrel, said cavities having walls, over which cavities the upper belt run of the lower transportation belt is adapted to successively pass, with the cavities provided in inserts, wherein the length and width of the cavities at least substantially corresponds to the length and width of the heating means, pressing means and cooling means respectively, and further including means for adjusting the temperatures of the cavities, and wherein walls of the cavities, excluding those walls facing the upper belt run of the lower transportation belt, are provided with insulating means.

2. Apparatus according to claim 1 wherein the means for adjusting the temperatures of the cavities is a fluid agent means for adjusting the temperatures of the cavities.

3. Apparatus as set forth in claim 2 wherein said fluid agent means utilizes a gas.

4. Apparatus as set forth in claim 2 wherein said fluid agent means utilizes a liquid.

5. Apparatus as set forth in claim 1 wherein the first cavity in the mandrel member is operatively associated with the heating means and includes an adjustable electrical resistance heating means.

6. Apparatus as set forth in claim 5 wherein the first cavity includes an induction heating means.

* * * * *